UNITED STATES PATENT OFFICE.

FRANK LEGH SLAZENGER, OF NEW YORK, N. Y.

PROCESS AND METHOD OF UNITING AND REINFORCING JOINTS.

1,205,116.      Specification of Letters Patent.      Patented Nov. 14, 1916.

No Drawing.      Application filed March 3, 1916. Serial No. 81,856.

*To all whom it may concern:*

Be it known that I, FRANK LEGH SLAZENGER, a citizen of the United States, residing at New York, in the county of New York and State of New York, have invented certain new and useful Improvements in Processes and Methods of Uniting and Reinforcing Joints; and I do hereby declare the following to be a full, clear, and exact description of the invention, such as will enable others skilled in the art to which it appertains to make and use the same.

My invention relates to an improved process and method of uniting and reinforcing joints and is more particularly designed for uniting and reinforcing the joints of lawn tennis rackets and the like at their vulnerable points.

One of the objects of my invention is to treat the wood constituting the joint to be united and reinforced by a special process and in such a manner as to render the wood porous and soft and to subsequently apply to the wood thus treated a body of vellum which has also been treated by a special process to render the vellum capable of interpenetrating the pores and interstices of the wood when subjected to heat and pressure and to become so intercommingled and interlocked with the fibers of the wood when cool that the vellum becomes molded into and forms a part of the wood bodies of the joint.

Another object of my invention is to treat the vellum in such a manner that the vellum becomes soft and tacky and subsequently cut the vellum while soft with a special form of die of the contour of the joint to be completed.

A further object of my invention is to subject the wood thus treated together with the vellum thus treated to pressure between two heated metallic bodies of the contour of the vellum and joint and to allow the wood, the vellum, and the heated metallic bodies to cool slowly to thereby insure the more efficient union of the vellum with the wood bodies of the joint.

In carrying out my process, I subject the wooden bodies comprising the joint to the action of steam, hot water, or other suitable agencies, to remove all resinous and gelatinous matter therefrom, and at the same time to expand the pores and interstices of the wooden bodies to render the same porous and spongy. At this stage the wooden bodies are sand papered to roughen the surfaces and then coated with a coating of Scotch glue. In the mean time, the vellum is placed in a steam boiler and retained therein until the vellum is soft and tacky. It is then removed from the boiler and cut in the shape of the joint to be united by a specifically constructed die which I employ for this purpose. After this step, the vellum is placed upon the surfaces of the prepared wooden bodies of the joint, and the wooden bodies with the vellum thereon is placed in a press and subjected to pressure between heated metallic bodies of the contour of the vellum and retained under pressure until all of the parts have become thoroughly cooled.

By this process of treating the wooden bodies of the joint and the vellum, and the method of applying the vellum to the wooden bodies, the vellum so thoroughly interpenetrates the pores and interstices of the wooden bodies, that when contraction sets in after the parts have become cooled, the particles of the wooden bodies and the particles of the vellum become so intermingled and interlocked as to constitute a single structure, and by retaining the parts under pressure between heated metallic bodies until all parts have slowly cooled, insures the more ready fusion of the fibers of the wooden bodies and the fibers of the vellum and the homogeneity of parts of the joint, and thus prevents the vellum separating from the wooden bodies and the rupture of the joint, providing an indestructible joint.

After the completion of the joint, the racket or other article is polished and dressed in the usual manner, and the joint is practically indiscernible.

Having described my invention, what I claim as new and desire to secure by Letters Patent, is:—

1. The process of uniting and reinforcing joints consisting in treating the wooden bodies of a joint to render the same porous and rough, coating the surfaces thus treated with an adhesive agency, applying a body of vellum treated to render the same soft upon the wooden bodies thus treated, and subjecting the parts to pressure between heated metallic bodies.

2. The process of uniting and reinforcing joints consisting in treating the wooden bodies of a joint with steam, hot water, or other agencies to expand the pores thereof to render the same spongy and soft, sand papering and coating with an adhesive agency the surfaces of the bodies thus treated, applying to the wooden bodies thus prepared a body of vellum which has been treated by boiling to soften the same, subsequently subjecting the parts of the joint thus prepared to pressure between heated metallic bodies, and allowing the parts to slowly cool for causing the fibers of the wooden bodies and the fibers of the vellum to become efficiently fused and interlocked with each other to form a unitary structure.

In testimony whereof I have signed my name to this specification in the presence of two subscribing witnesses.

FRANK LEGH SLAZENGER.

Witnesses:
J. C. WOOD,
E. L. BRUIN.